July 25, 1944.    J. MARCO    2,354,270
SEAL GLAND AND ARMOR THEREFOR
Original Filed Dec. 16, 1939
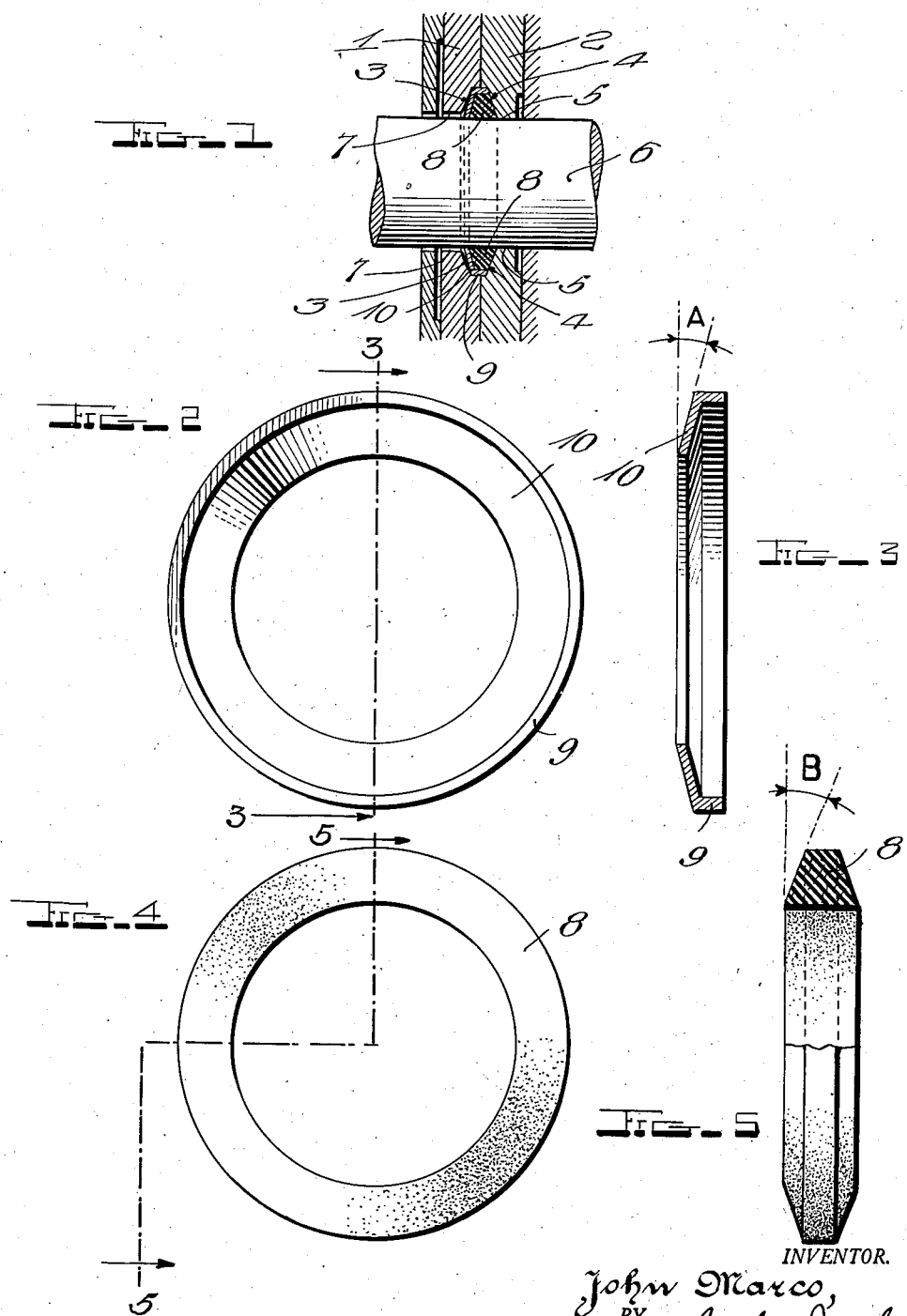
INVENTOR.
John Marco,
BY
Jacobi & Jacobi
ATTORNEYS Patented July 25, 1944

2,354,270

UNITED STATES PATENT OFFICE 2,354,270

SEAL GLAND AND ARMOR THEREFOR

John Marco, Wilmington, Del., assignor to Marco Company, Inc., Wilmington, Del., a corporation of Pennsylvania Original application December 16, 1939, Serial No. 309,661. Divided and this application November 19, 1942, Serial No. 466,193

4 Claims. (Cl. 286—26)

My invention relates to new and useful improvements in seal glands and more particularly to seal glands applicable to use in connection with elements of pressure pumps and the like, this being a divisional application of my pending application Serial No. 309,661, filed December 16, 1939, and allowed September 28, 1942.

One of the primary objects of the invention resides in the provision of a seal gland designed to cooperate with an armor therefor so constructed that the greater the pressure thereon, the greater the effectiveness of the seal gland.

A further object of the invention resides in the provision of a seal gland formed of a flexible material, such as a composition of rubber and fabric, designed with the faces tapering at a predetermined angle toward the peripheral edge.

Still another object resides in providing a metallic armor for the seal gland having a side flange disposed at a predetermined angle of lesser degree than the angularity of the taper of the side faces of the seal gland and adapted to cooperate with the latter to increase effectiveness of said gland as pressure is applied to the armor.

A still further object of the invention resides in providing a gland and armor therefor which is comparatively simple and durable in construction, inexpensive to manufacture and one which will be very efficient in operation.

With these and numerous other objects in view, my invention consists in the novel features of construction, combination and arrangement of parts, as will be hereinafter referred to and more particularly pointed out in the specification and claims.

In the accompanying drawing, forming a part of this application,

Figure 1 is a fragmentary vertical section through a portion of a pump structure, such as illustrated in my pending application Serial Number 309,661, of which this application is a division, showing my improved seal gland and armor therefor applied to use;

Figure 2 is a front elevation of the armor removed from the seal gland and enlarged with respect to the showing thereof in Figure 1;

Figure 3 is a vertical section through the armor, as seen on line 3—3 of Figure 2, looking in the direction of the arrows;

Figure 4 is an elevation of the seal gland removed and enlarged, with respect to the showing thereof in Figure 1; and Figure 5 is a vertical section through the seal gland, as seen on the line 5—5 of Figure 4.

In describing the invention, I shall refer to the drawing, in which similar reference characters designate corresponding parts throughout the several views and in which the numerals 1 and 2 represent seal plates in a pump structure of the type shown in my pending application Serial Number 309,661, of which this is a division, the abutting faces of said seal plates being provided with tapered chambers 3 and 4, respectively, surrounding the bores 5 thereof. A shaft 6 adapted for supporting a rotor (not shown) extends through the bores 5 of said seal plates. Such a construction, as aforesaid, is illustrated in my above referred to co-pending application, but it will be understood, of course, that my improved seal gland and armor may be applied to use in connection with other devices or in association with other types of elements, as may be desired.

In the particular structure shown, with which my improved seal gland and armor are particularly applicable, a groove 7 is provided in the one seal plate 1 on each side of the bore 5 thereof leading from the front face of said plate toward the chamber 3. Through this groove pressures developed in the pump are adapted to pass, that is, the material under pressure is adapted to pass into these grooves toward the chamber 3. To prevent the passage of any fluid under pressure at this point, I provide my improved seal gland and armor.

Applied to the shaft 6 to fit snugly thereover and also fit within the chambers 3 and 4, I provide the gland 8 which is in the form of an annulus, formed preferably of a composition of fabric and rubber, although it will be understood that it may be formed of other materials, if desired, affording a certain amount of rigidity and also affording flexibility. The opposite side faces of this seal gland are tapered to a predetermined angle of approximately 26 degrees, this being illustrated in dot-and-dash lines and represented by the letter B in Figure 5 of the drawing. This taper or inclination of the side faces of the gland corresponds to a similar taper or inclination of the walls of the chambers 3 and 4 in the seal plates in which the gland is adapted to be disposed, as clearly shown in Figure 1 of the drawing.

The metal armor above referred to is designated by the numeral 9 and the same is in the form of an annulus provided with a side flange 10 projecting from one side peripheral edge thereof. This flange 10 is disposed at a predetermined angle, substantially 13 degrees. The diameter of the armor 9 is such as to permit the seal gland 8 fit snugly therein and the side flange 10 is adapted to abut the one side inclined face of the gland. By reason of the difference in the angularity of the faces of the seal gland and the flange of the armor, these elements, when brought together through the abutment or compression of the seal plates 13 and 14, will cause a preliminary tension to be applied to the gland by said armor, thus forming a tight seal about the shaft 6 when the device is first set up. This is clearly illustrated in Figure 1 of the drawing and it will be seen that as pressures are built up and directed through the grooves 7, same will be applied to the front face of the armor, thus increasing the pressure thereon against the seal gland and causing the latter to bind more tightly and become more effective as a seal around the shaft 6.

While I have indicated above a preferred angularity or taper for the side faces of the gland, represented by the dot-and-dash lines and the letter B in Figure 5 and, likewise, indicated a preferred angularity for the flange of the armor, such angularity being represented by dot-and-dash lines and the letter A in Figure 3 of the drawing, I desire it understood that I do not wish to be limited to this particular degree of angularity. While I have found that the degrees of angularity mentioned above are preferable, it is to be understood that this may be changed or varied, without affecting the invention. It is also to be understood that while I have shown and described the invention as applicable to elements of a particular pump structure, such as illustrated in my co-pending application previously referred to, I do not wish to be limited in the use of this invention to that particular structure, as it is equally well adapted for use with or without variation to other structures and other devices where the necessity for seal glands may occur.

From the foregoing description of the construction of my improved invention, the application of same to use and the operation thereof will be readily understood and it will be seen that I have provided a comparatively simple, inexpensive and efficient means for carrying out the objects of the invention.

While I have particularly described the elements best adapted to perform the functions set forth, it is apparent that various changes in form, proportion and in the minor details of construction may be resorted to, without departing from the spirit or sacrificing any of the principles of the invention.

What I claim is:

1. In a device of the class described, a continuous annular seal gland having inner and outer peripheral edge faces and side faces thereon, the side faces thereof being tapered toward its outer periphery, and a protecting armor therefor of continuous annular formation surrounding the outer periphery of said gland and having a continuous annular side flange angularly disposed with respect thereto and in contact with the one side face of said gland, the angularity of said flange with respect to the annular armor being less than the angularity of the last mentioned side face of the gland with respect to the periphery of the latter.

2. In a device of the class described, a seal gland comprising a continuous annular body formed with inner and outer peripheral edge faces and side faces, said side faces being tapered toward the outer periphery of the body, and a continuous annular protecting armor for said gland surrounding the outer periphery of the latter in snug fitting engagement therewith and having an annular side flange disposed at an angle of lesser degree than the angularity of the tapered adjacent face of said gland.

3. In a device of the class described, a seal gland comprising an annular body having inner and outer peripheral edge faces and side faces, said side faces converging toward the outer periphery of the body, and a metal covering for said body comprising an annular ring unbroken throughout its periphery and fitting snugly about the outer periphery of said body and having a continuous side flange for contacting with one side face of said body, said flange being initially inclined to an angle of materially less degree than the angularity of the adjacent side face of said gland with which it contacts.

4. In a device of the class described, a pair of abutting seal plates having registering openings therein, a shaft extending through the openings in said plates, the abutting faces of said plates surrounding the openings therein being formed with tapered counterbores registering with each other and forming a chamber, a circular seal gland fitted in the chamber formed by the tapered counterbores of said abutting plates said seal gland being unbroken throughout its circumference and having the side faces thereof tapered disposed at angles coincident to the tapering of said counterbores, and an annular protecting armor for said gland unbroken throughout its circumference and surrounding the periphery of the latter within said counterbores and having an unbroken side flange thereon extending continuously about its circumference disposed at an angle of lesser degree than the angularity of the tapered adjacent face of said gland, as and for the purposes described.

JOHN MARCO.